United States Patent [19]
van Boxtel

[11] 4,067,940
[45] Jan. 10, 1978

[54] METHOD OF CONTINUOUSLY HEATING LIMESTONE-MUD

[76] Inventor: Peter van Boxtel, 250 Briar Hill Ave., Toronto, Ontario, Canada

[21] Appl. No.: 463,971

[22] Filed: Apr. 25, 1974

[51] Int. Cl.² .............................................. B28B 11/16
[52] U.S. Cl. ...................................... 264/67; 264/149; 264/150; 264/163; 264/176 R
[58] Field of Search ...................... 264/176, 56, 176 R, 264/64, 67, 141, 149, 163, 334, 150; 423/177; 432/1; 425/381, 308, 404

[56] References Cited
U.S. PATENT DOCUMENTS

| | | | |
|---|---|---|---|
| 3,587,281 | 6/1971 | Lemelson | 264/209 |
| 3,886,244 | 5/1975 | Bayer et al. | 264/56 |
| 3,886,245 | 5/1975 | Bayer et al. | 264/56 |

Primary Examiner—Robert F. White
Assistant Examiner—John A. Parrish
Attorney, Agent, or Firm—Emory L. Groff, Jr.

[57] ABSTRACT

The present invention provides in a method of continuously heating limestone-mud, particularly the calcination of the limestone-mud to form lime, which method comprises continuously passing the mud through a refractory lined chamber where it is contracted with hot gases, the improvement in which the mud is passed through the chamber as at least one continuous self-sustaining column, the hot gases contacting the outer periphery of the column. The invention also provides an apparatus for use in said method.

6 Claims, 3 Drawing Figures

METHOD OF CONTINUOUSLY HEATING LIMESTONE-MUD

The present invention relates to a method and apparatus for heating limestone-mud such as for preheating and drying said mud and in particular calcining said mud to form lime.

Limestone-mud which is also known as precipitated calcium carbonate and calcium carbonate sludge and has a high calcium carbonate content, is conventionally calcined to produce lime. Such calcination is achieved by heating the limestone-mud to a temperature of at least 1600° F with the generation of carbon dioxide.

Heretofore such calcination has been effected in a rotary kiln. A typical rotary kiln consists of a refractory-lined openended steel plate cylinder inclined from the feed-end to the discharge-end thereof and rotatable about its longitudinal axis. The movement of the material through the kiln from the feed-end to the discharge-end is accomplished solely by the carry-up of material to its natural angle of repose inside the refractory lining in the direction of rotation of the kiln and the subsequent cascading or rolling over of the material down its angle of repose towards the discharge-end of the kiln. A heat recuperating chain system is also disposed in the feed-end of the kiln so that when the kiln is rotated the heat-transfer chains alternately dip into the wet material and are lifted out with a coating of material. The heat-recuperating chain system has materially increased the efficiency of heat utilization in the rotary kiln and reduced the fuel required per unit of production of lime. However, the non-uniform discharge from the rotary kiln prevents the use of hot lime slaking which is not practical with a rotary kiln where lime can occasionally hold up in the kiln and then come out as slugs. The rotary kiln has other disadvantageous features such as high fuel costs, poor quality control and dust problems.

The present invention provides a method of heating and preferably calcining limestone-mud and an apparatus for use in said method which method involves low fuel consumption, a relatively constant material discharge and a substantially dust-free flue gas discharge from the apparatus.

It has now been found that this may be achieved by passing the limestone-mud as at least one continuous self-sustaining column through a stationary refractory-lined chamber where it is subjected to contact with the hot gases on the outer periphery thereof.

According to the present invention therefore, there is provided in a method of continuously heating limestone-mud which comprises continuously passing said mud through a refractory chamber where it is contacted with hot gases, the improvement in which said mud is passed through said chamber as at least one continuous self-sustaining column, the hot gases contacting the outer periphery of said column to effect heating thereof.

The present invention also provides an apparatus for heating limestone-mud comprising a refractory-lined chamber, means for passing hot gases into said chamber, means for allowing exhaust gases to pass out from said chamber, at least one tubular member arranged to extend through said chamber for the formation of a continuously moving column of limestone-mud thereon, and an extrusion device adapted to extrude said column of limestone-mud onto each said tubular member and cause said column to pass along said member and through said chamber.

The apparatus of the present invention may include a single tubular member for the continuous passage of a single column of limestone-mud therethrough, or a plurality of spaced tubular members for the passage of a plurality of columns simultaneously through said chamber.

In a particular embodiment of the present invention, the column passes downwardly through the roof into the chamber then through the floor out of the chamber. In order to facilitate removal of the heated column from the tubular member after it has passed through said chamber, the tubular member is provided adjacent the lower end thereof and outside said chamber with a splitter member. This splitter member due to the movement of the column along said tubular member inherently causes the column to split and become detached from the tubular member and the heated limestone-mud can then be removed.

The extrusion device for forming the column about the tubular member desirably comprises a vertically disposed extrusion tube into which the tubular member extends, the tube being provided with a reciprocable piston and a feed arm through which feed arm the mud is fed to the tube where it is formed into the column and extruded downwardly about the tubular member by reciprocation of the piston in the tube. The feed mechanism for feeding the mud through the feed arm to the tube suitably comprises a screw conveyor or an air operated double-diaphragm pump. In order to inter alia initiate the formation of the column the tubular member is desirably biased e.g. spring-biased or biased by a hydraulic or pneumatic system to a retracted position in which the splitter member lies adjacent the lower end of the extrusion tube and the tubular member is adapted to be progressively moved through the chamber to an extended position by means of reciprocation of the piston. The column is initially formed by the pressure of the piston against the bias of the tubular member, a disc of combustible material being initially present adjacent the splitter member for forming an abutment with the column which disc is gradually consumed by the hot gases during its subsequent passage through the chamber. The tubular member is lockable in its extended position for continued operation of the method. The biassing of the tubular member also assures an equilibrium between the mud forming the column and the center tube during travel of the column through the chamber.

The apparatus desirably includes a refractory-lined flue chamber with flue ports for passage of hot burner gases into the chamber to heat the column.

The consistency of the limestone-mud should be such as to form a self-sustaining column in the chamber on the tubular member and suitably the limestone-mud has a solids content of from 60 to 70% and preferably about 65%. The required solids content will depend upon the conditions of operation of the method and may be readily determined experimentally and the water content of the mud fed to the extrusion device may be controlled by suitable control mechanisms.

While the present invention is suitable for any desired heat treatment of the limestone-mud, such as preheating and drying, in a particular embodiment thereof it is used for the calcination of the limestone-mud, the temperature in the chamber being raised to at least about 1600°

F, the generated carbon dioxide and the flue gases being exhausted from the chamber.

The present invention will be further illustrated by way of the accompanying drawings in which.

Figure 1:
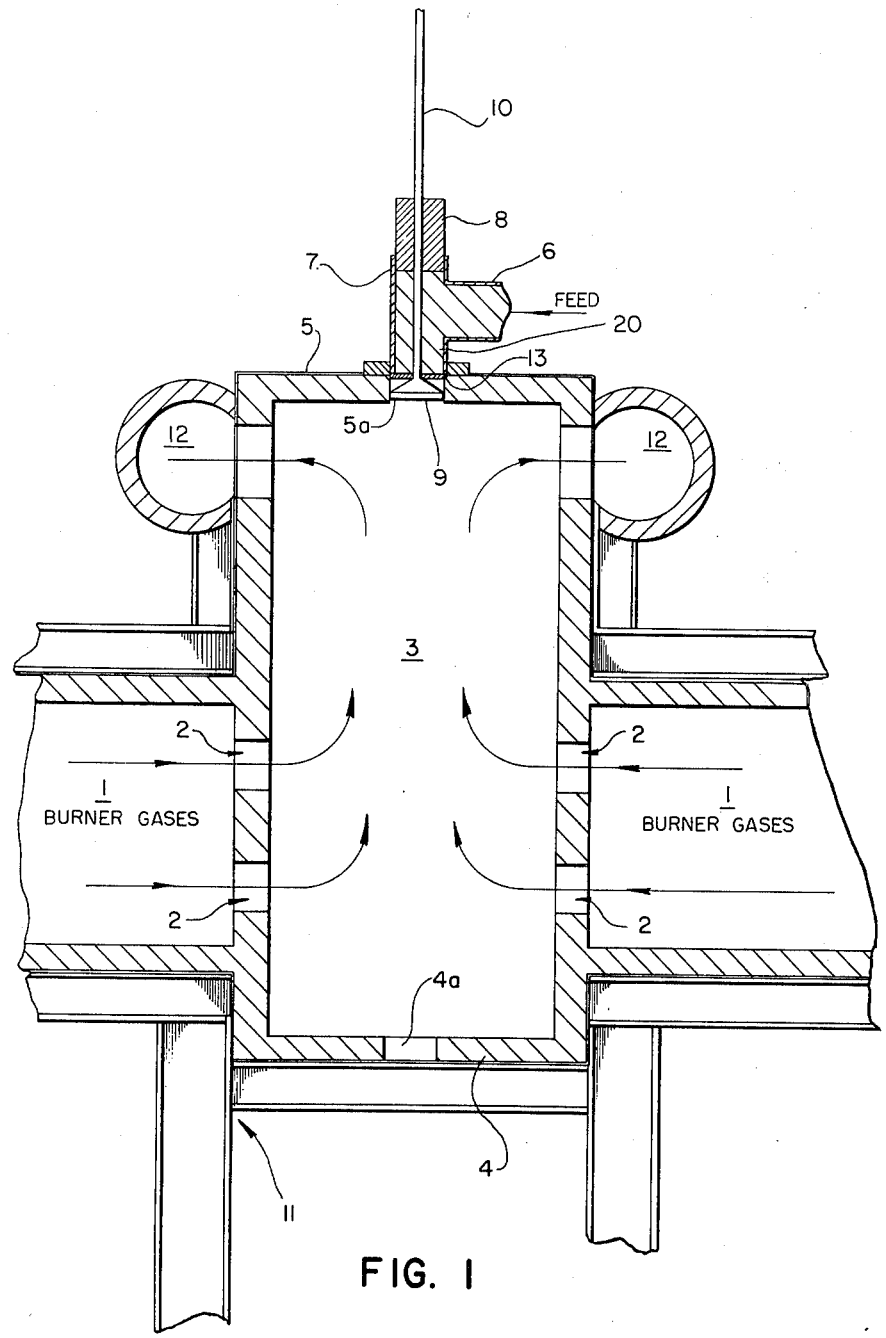
FIG. 1 is a vertical section through an apparatus according to one embodiment of the present invention in which the tubular member is disposed in a position for initiation of the method.

Referring to the drawings the apparatus comprises a refractory-lined chamber 3 having inlet flue ports 2 for the passage of hot burner gases therein from the refractory-lined flue chambers 1. The flue gases and any gases generated in the chamber 3 are exhausted through exhaust ducts 12 which are of a conventional design. The chambers 1 and 3 are supported on a steel framework 11. The opposed walls formed by the floor 4 and roof 5 of the chamber 3 have aligned openings 4a and 5a respectively for the continuous passage of a column 20 of limestone-mud downwardly through the chamber 3.

A tubular member 10 having a splitter member 9 at the lower end thereof is arranged to pass through the openings 5a and 4a and is spring-biased to a retracted position as shown in FIG. 1 in which the splitter member 9 lines adjacent the lower end of the tube 7. The mud is formed into a column 20 by means of an extrusion device comprising an extrusion tube 7 having a piston 8 mounted for reciprocation therein so as to compress limestone-mud fed to said tube 7 through the feed arm 6.

Figure 2:
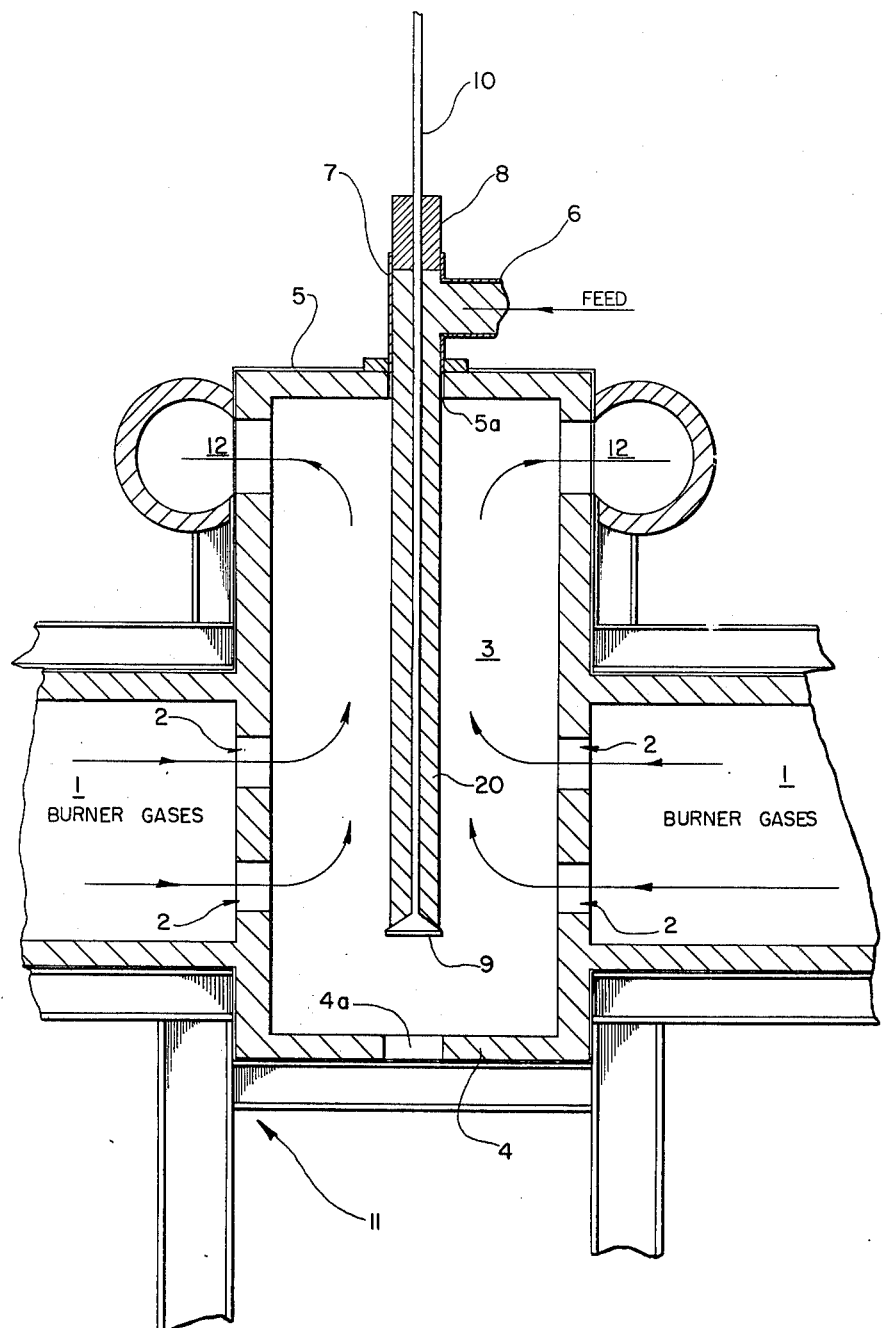
FIG. 2 is a similar view of the apparatus of FIG. 1 during the initiation of the method and FIG. 3 is a view of the apparatus similar to FIG. 1 during the subsequent continuous operation of the method.
Figure 3:
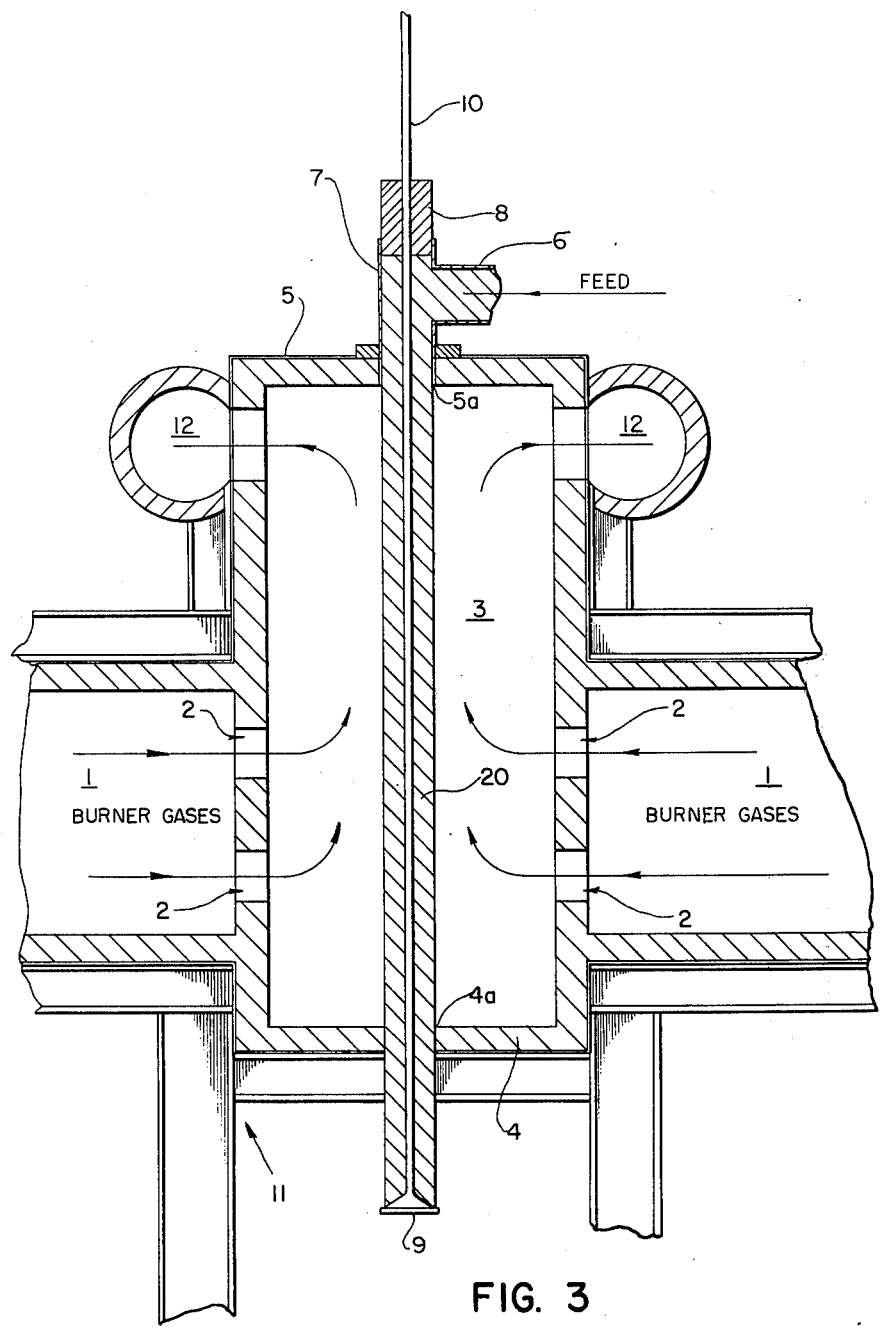

In effecting the method of the present invention, the hot burner gases from the chamber 1 pass through the ports 2 into the chamber 3 and exit from the chamber 3 through the exhaust ports 12. The tubular member 10 is initially in the position shown in FIG. 1 and has a wooden disc 13 mounted thereon, the wooden disc abutting the end of the tube 7. In start-up operations of the method an initial pressure inside the tube 7 is built up to provide a proper friction between the limestone-mud and the tube 7. This initial pressure is caused by the wooden disc 13 mounted on the tube 10 on top of the splitter member 9. The spring-biased tube 10 maintains the splitter member 9 and disc 13 against the end of the tube 7 and in this position the tube 10 is locked against any movement. After limestone-mud is fed through the feed arm 6 into the tube 7, the piston 8 moves downwardly and applies the required initial pressure to the limestone-mud which unlocks the tube 10 and moves it downwardly together with the splitter member 9 and the wooden disc 13 to form the limestone column 20 with the introduction of fresh extruded limestone-mud into the column 20. In the tube 7 the piston compresses the mud generally to about half its volume by applying a slight pressure. It is thus preferred as shown in the drawing that the feed of the mud takes place in the upper part of the tube 7 which thus avoids undesirable pressures in the feed arm 6 when the piston 8 compresses the mud. The piston 8 suitably compresses the mud at between 500 and 1000 psi depending on the water content. Lower pressures in the range do have the advantage of reduced power consumption for extruding the mud and faster calcination thereof in the chamber 3 due to the more exposed condition of the individual limestone particles in the column 20 during calcination. As the limestone-mud column 20 passes through the hot zone in the chamber 3 as shown in FIG. 2, the wooden disc burns up and the limestone-mud column comes into contact with the splitter member 9. At the end of the initial start-up of the method as shown in FIG. 3, the tubular member 10, which is suitably water-cooled to withstand the high temperatures in the chamber 3, passes through the opening 4a in the bottom 4 of the chamber 3 such that the splitter member 9 lies outside the chamber 3. On continued feeding of limestone-mud to the tube 7 through the feed-arm 6, the column 20 of limestone-mud is continuously pushed through the chamber 3 where it is contacted with the hot gases to effect preheating, drying or perferably calcination thereof and on exiting from the chamber 3, the column 20 is split by the splitter member 9 to yield the heated product. In the chamber 3 during calcination, at least a portion of the limestone-mud is calcined into lime. It will be seen that the capacity of the apparatus is determined for a particular diameter of column 20, such as a 3 inch column, by the length of each column 20, the number of columns 20 and the length of time necessary for the column to be retained in the chamber 3 to calcine the limestone in the mud.

It will also be seen that the descending columns 20 do not have any rubbing action except by the hot gases and thus the dust problem present with rotary kilns is essentially removed.

Further, the method of the present invention has a lower fuel consumption because inter alia the column 20 in the upper part of the chamber passes through a preheat section and thus may be exposed in a favourable manner to preheating by the hot gases. In particular a horizontal shield may be employed which divides the chamber 3 into a preheat section and a calcining section. This provides the alternate options of directing the gases horizontally across the preheat section of the chamber 3 which yields a higher heat transfer rate and consequently a lower fuel consumption for a given size of chamber 3. Further in compressing the mud in forming the column 20 a certain amount of waste is removed which does not have to be vapourized by the hot gases.

It will further be seen that in the process of the present invention there is uniform discharge of the calcined material from the apparatus which is highly condusive to hot lime slaking.

In an Example of the method of the present invention a limestone-mud having a consistency of 65% solids and the following composition was used in the apparatus as shown in the drawings to form a column 20 having a diameter of 3 inches.

The limestone-mud had the following composition by weight.

| | |
|---|---|
| $CaCO_3$ | 97.62% |
| Free CaO | .50% |
| $MgCO_3$ | .30% |
| $Na_2O$ | 1.09% |
| Sulphur | 0.25% |
| Phosphorous | 0.15% |
| | 100% |

In the extrusion device the mud is compressed to about half its original volume at a pressure of 750 psI. The temperature in the chamber was 2200° F and the product obtained had a calcium oxide content in excess of 90% by weight.

I claim:

1. A method for heating limestone-mud consisting of the steps of: extruding a column of limestone-mud having a solid content of from 60 to 70% with the remaining content water, about a tubular member disposed within an extrusion tube and through an opening in one wall of a refractory chamber; continuing the extrusion of said limestone-mud about said tubular member with the simultaneous advancement of the limestone-mud and tubular member through the interior of said chamber with said limestone-mud forming a self-sustaining column about said tubular member within said chamber interior; admitting heated gases into said chamber in contact with said advancing column to heat said limestone-mud; further continuing the extrusion of said limestone-mud and advancement of said tubular member to pass said tubular member and its surrounding self-sustaining column through an opening in an opposite wall of said chamber and to a position external of said chamber, and removing said column from said tubular member external of said chamber.

2. A method for heating limestone-mud consisting of the steps of: extruding a column of limestone-mud having a solid content of from 60 to 70% with the remaining content water, about a tubular member having a splitter member disposed on the end thereof, said tubular member being disposed within an extrusion tube and through an opening in one wall of a refractory chamber; continuing the extrusion of said limestone-mud about said tubular member with the simultaneous advancement of the limestone-mud and tubular member through the interior of said chamber with said limestone-mud forming a self-sustaining column about said tubular member within said chamber interior; admitting heated gases into said chamber in contact with said advancing column to heat said limestone-mud; further continuing the extrusion of said limestone-mud and advancement of said tubular member to pass said tubular member and its surrounding self-sustaining column through an opening in an opposite wall of said chamber and to a position external of said chamber, and further continuing said step of extruding said limestone-mix to pass said column through said opening in said opposite wall of said chamber to cause passage of said column along said tubular member external of said chamber to urge said heated limestone-mud passing out of said chamber to contact said splitter member and become detached from said tubular member.

3. A method as claimed in claim 1, in which each column is passed in a downward direction through said chamber.

4. A method as claimed in claim 1, in which the heated gases are produced by a burner.

5. A method as claimed in claim 1, wherein, said heated gases cause the limestone-mud to be pre-heated and dried within said chamber.

6. A method as claimed in claim 1, wherein, said heated gases cause the limestone-mud to be calcined within said chamber.

* * * * *